United States Patent
Edmondson et al.

(10) Patent No.: US 7,620,793 B1
(45) Date of Patent: Nov. 17, 2009

(54) MAPPING MEMORY PARTITIONS TO VIRTUAL MEMORY PAGES

(75) Inventors: John H. Edmondson, Arlington, MA (US); Henry P. Moreton, Woodside, CA (US)

(73) Assignee: NVIDIA Corporation, Santa Clara, CA (US)

( * ) Notice: Subject to any disclaimer, the term of this patent is extended or adjusted under 35 U.S.C. 154(b) by 340 days.

(21) Appl. No.: 11/467,679

(22) Filed: Aug. 28, 2006

(51) Int. Cl.
*G06F 9/26* (2006.01)
*G06F 9/34* (2006.01)
*G06F 12/00* (2006.01)
*G06F 12/06* (2006.01)
*G06F 13/28* (2006.01)
*G06T 11/40* (2006.01)

(52) U.S. Cl. .......................... 711/208; 711/5; 711/205; 711/207; 711/173; 345/552; 345/564; 345/570

(58) Field of Classification Search .................. None
See application file for complete search history.

(56) References Cited

U.S. PATENT DOCUMENTS

| 6,411,302 B1 * | 6/2002 | Chiraz | 345/545 |
| 6,889,307 B1 * | 5/2005 | Scheuerlein | 711/202 |
| 6,999,088 B1 * | 2/2006 | Van Dyke et al. | 345/544 |
| 2006/0067146 A1 * | 3/2006 | Woo et al. | 365/206 |
| 2007/0016732 A1 * | 1/2007 | Ohtsuka et al. | 711/150 |
| 2007/0061547 A1 * | 3/2007 | Jordan et al. | 711/207 |

OTHER PUBLICATIONS

Hennessy and Patterson, Computer Architecture, 2003, Morgan Kaufmann, 3rd Edition, pp. 460-461.*

* cited by examiner

*Primary Examiner*—Brian R Peugh
*Assistant Examiner*—Chad L Davidson
(74) *Attorney, Agent, or Firm*—Patterson & Sheridan, LLP (57) ABSTRACT

Systems and methods for addressing memory using non-power-of-two virtual memory page sizes improve graphics memory bandwidth by distributing graphics data for efficient access during rendering. Various partition strides may be selected for each virtual memory page to modify the number of sequential addresses mapped to each physical memory partition and change the interleaving granularity. The addressing scheme allows for modification of a bank interleave pattern for each virtual memory page to reduce bank conflicts and improve memory bandwidth utilization. The addressing scheme also allows for modification of a partition interleave pattern for each virtual memory page to distribute accesses amongst multiple partitions and improve memory bandwidth utilization.

18 Claims, 10 Drawing Sheets

PRIOR ART

MAPPING MEMORY PARTITIONS TO VIRTUAL MEMORY PAGES

BACKGROUND OF THE INVENTION

1. Field of the Invention

Embodiments of the present invention generally relate to mapping DRAM (dynamic random access memory) partitions to virtual memory pages and, more specifically, to using a non-power-of-two virtual memory page size.

2. Description of the Related Art

Conventional multithreaded processing systems for graphics processing use off-chip memory to store image data and texture map data. A frame buffer memory constructed of DRAM devices is used to store the image data and texture map data. When multiple DRAM devices are used it is desirable to store portions of the image data or texture map data in each of the DRAM devices in order to access the portions in parallel. Therefore, more data may be read or written in a single clock cycle to optimize the available memory bandwidth between the frame buffer memory and the graphics processor.

Figure 1:
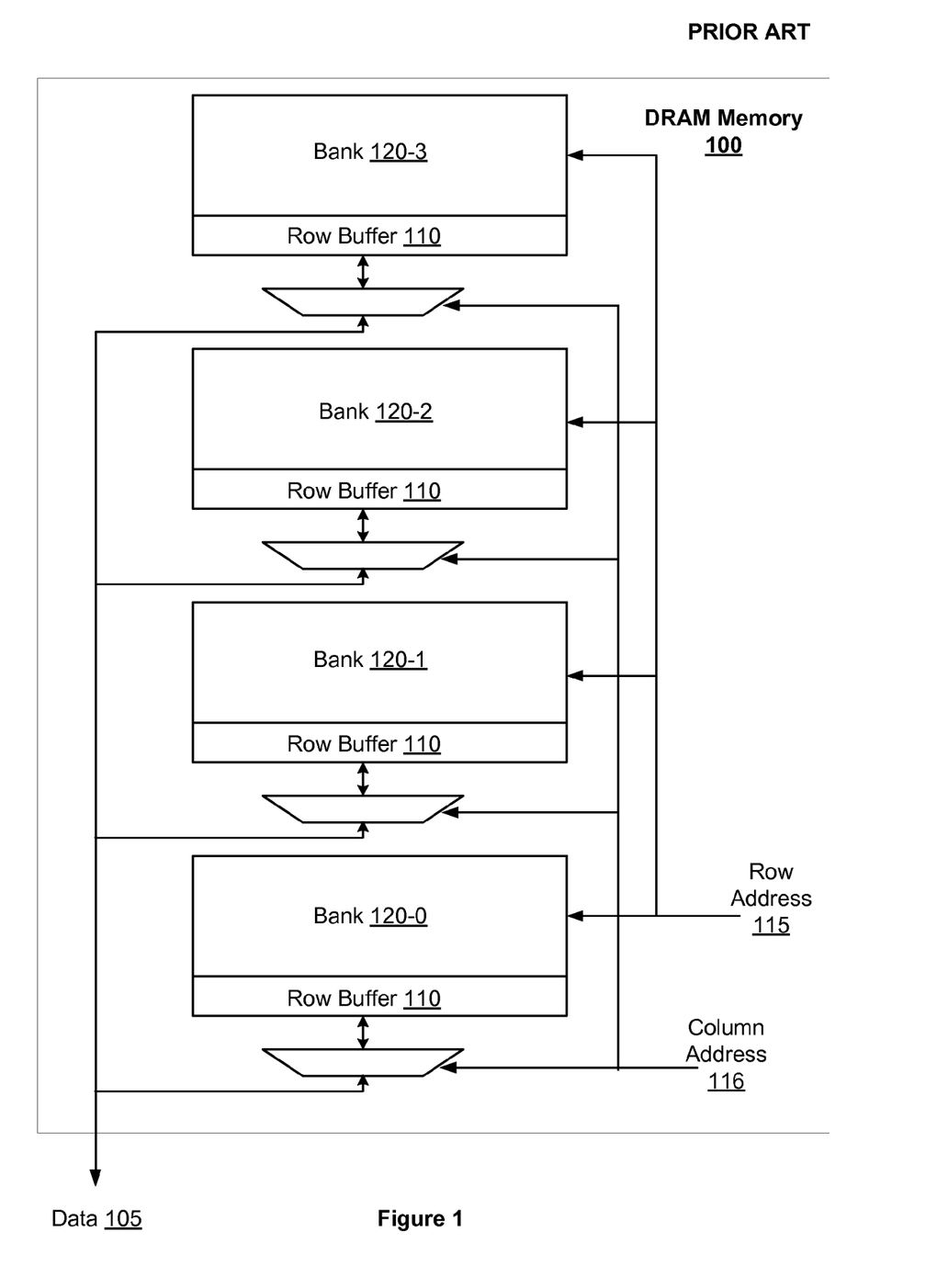
FIG. 1 illustrates a prior art block diagram of DRAM (dynamic random access memory) memory 100.

FIG. 1 illustrates a prior art block diagram of DRAM memory 100. The basic unit of DRAM organization is a bank, such as banks 120-0, 120-1, 120-2, and 120-3 of DRAM memory 100. Each bank 120 has a single row buffer to store a row of data to be written to or that was read from the bank. Row address 115 is used to select a single row from each bank to load into each row buffer 110 for a read operation or to load from each row buffer 110 for a write operation. Column address 116 selects a portion of a row stored in each row buffer 110. A conventional DRAM memory 100 is configured with 2 Kbytes per row and column address 116 selects 16 bytes of the 2 Kbyte row for output to or input from data 105.

Moving data from a bank 120 to a row buffer 110 requires an activate operation. Similarly, moving data from a row buffer 110 to a bank 120 requires a precharge operation. There is a minimum delay for switching between activate and precharge operations that is typically several clock cycles. Therefore, it is desirable to complete all read and/or write operations for a particular row before switching to a different row.

Furthermore, because the data bus for transporting data 105 is shared it is desirable to read or write row buffers 110 in contiguous clock cycles. Interleaving read and write operations for each bank will lower performance due to the overhead required to change the direction of the shared bus to transition from reads to writes or from writes to reads. Spreading a sequence of read operations or write operations across banks 120 permits hiding of activate or precharge operations. For example, during a read sequence, data loaded into row buffer 110 corresponding to bank 120-0 may be output as data 105 while bank 120-1 is precharged for a subsequent read in the sequence. When different rows of the same bank are accessed the precharge and activate delays cannot be hidden.

Accesses may be spread across banks 120 by interleaving data for a graphics surface, such as a texture map or image. As a scanline is traversed during rendering, banks 120 are accessed in sequence. Similarly, as a texture map is read portions of data may be read from each bank 120. It is desirable to modify the granularity of the interleaving depending on surface characteristics of each graphics surface, such as the number of bits per pixel or texel. It is also desirable to modify the interleaving pattern to spread accesses across multiple banks rather than concentrating accesses within a single bank, resulting in "bank conflicts." Accordingly, the memory addressing mechanism used to read and write a local memory embodied using DRAM memory to store graphics surfaces should allow different interleave patterns to spread accesses across multiple banks to avoid bank conflicts.

SUMMARY OF THE INVENTION

Systems and methods for addressing memory using non-power-of-two virtual memory page sizes improve graphics memory bandwidth by distributing graphics data for efficient access during rendering. The virtual memory pages map to a physical address space to address memory locations in DRAMs that are used to store graphics surfaces. The address space is divided into sets of sequential addresses that are each mapped to a single DRAM partition, producing an address space interleaved across the DRAM partitions.

The span in address space between one partition and the next is the partition stride. Each partition stride effectively specifies a portion (number of bytes) of each partition that is used to create a contiguous physical memory space equal to the partition stride scaled by the number of partitions. The equal portions of each one of the partitions are interleaved in a repeating pattern to fill a memory page. When the number of partitions is not a power of two, i.e., 3, 5, 6, 7, 9, or the like, and the virtual memory page size is a power-of-two, the number of bytes from each partition allocated for a virtual memory page is not equal.

In order to modify the partition interleave pattern without causing memory address aliasing, the number of bytes from each partition allocated for a virtual memory page must be equal since a graphics surface may include several virtual memory pages that do not map to contiguous physical memory addresses. Likewise, in order to modify the bank interleave pattern without causing memory address aliasing, the number of bytes from each partition allocated for a virtual memory page must also be equal. Therefore, non-power-of-two virtual page sizes, where log base 2 of the non-power-of-two virtual page size is not an integer, are needed to allow each virtual page to use a specific bank interleave pattern, partition stride, and partition interleave pattern to improve bandwidth utilization. Conventional systems do not use non-power-of-two virtual page sizes and are not able to use efficient addressing schemes to modify bank interleave patterns and partition interleave patterns.

Various embodiments of a method of the invention for mapping memory constructed of multiple partitions to a virtual memory space that includes determining a number of banks in a bank set as a number of banks in a dynamic random access memory (DRAM) device included in each one of the multiple partitions, determining a number of partitions in the multiple partitions that are available in the memory, and computing a virtual memory page unit size for the virtual memory space as a product of the number of partitions, a partition stride, and the number of banks in the bank set. The partition stride specifies a span in address space between adjacent partitions of the multiple partitions.

Various embodiments of the invention include a system for mapping memory constructed of multiple partitions to a virtual address space include a virtual to physical address mapping unit, a first partition controller, and a second partition controller. The virtual to physical address mapping unit is configured to store mapping information for non-power-of-two size virtual memory pages allocated to a graphics surface, wherein the mapping information includes a physical memory page address and a partition stride that specifies a span in address space between adjacent partitions of the multiple partitions. The first partition controller corresponds to a first partition number and is configured to receive physical addresses from the virtual to physical address mapping unit to read data from the memory or write data to the memory. The second partition controller corresponds to a second partition number and is configured to receive physical addresses from the virtual to physical address mapping unit to read data from the memory or write data to the memory.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Therefore, non-power-of-two virtual page sizes are needed to allow each virtual memory page to use a specific bank interleave pattern, partition stride, and partition interleave pattern to improve bandwidth utilization when a non-power-of-two number of memory partitions are used for a frame buffer memory. When power-of-two virtual memory page sizes are used with a non-power-of-two number of memory partitions memory address aliasing problems occur when physical memory address bits are efficiently reorganized to control the bank interleave pattern and partition interleave pattern.

The frame buffer memory used to store image data and texture maps is divided into physical memory partitions, where each partition corresponds to the physical memory provided by a pair of DRAMs or any number that is a power of two, e.g., 1, 2, 4, or the like. The number of partitions is not limited to a power-of-two, i.e., 1, 2, 4, 8, or the like, allowing for a greater variety of system configurations. Various partition strides may be selected to modify the number of sequential addresses mapped to each DRAM and change the interleaving granularity for each virtual memory page that is mapped to the frame buffer memory. A memory addressing scheme is used to allow different partition strides, partition interleave pattern, and bank interleave pattern for each virtual memory page without causing memory aliasing problems in which physical memory locations in one virtual memory page are also mapped to another virtual memory page. When the number of partitions is not a power-of-two, a non-power-of-two virtual memory page size is used to avoid memory aliasing problems.

Figure 2A:
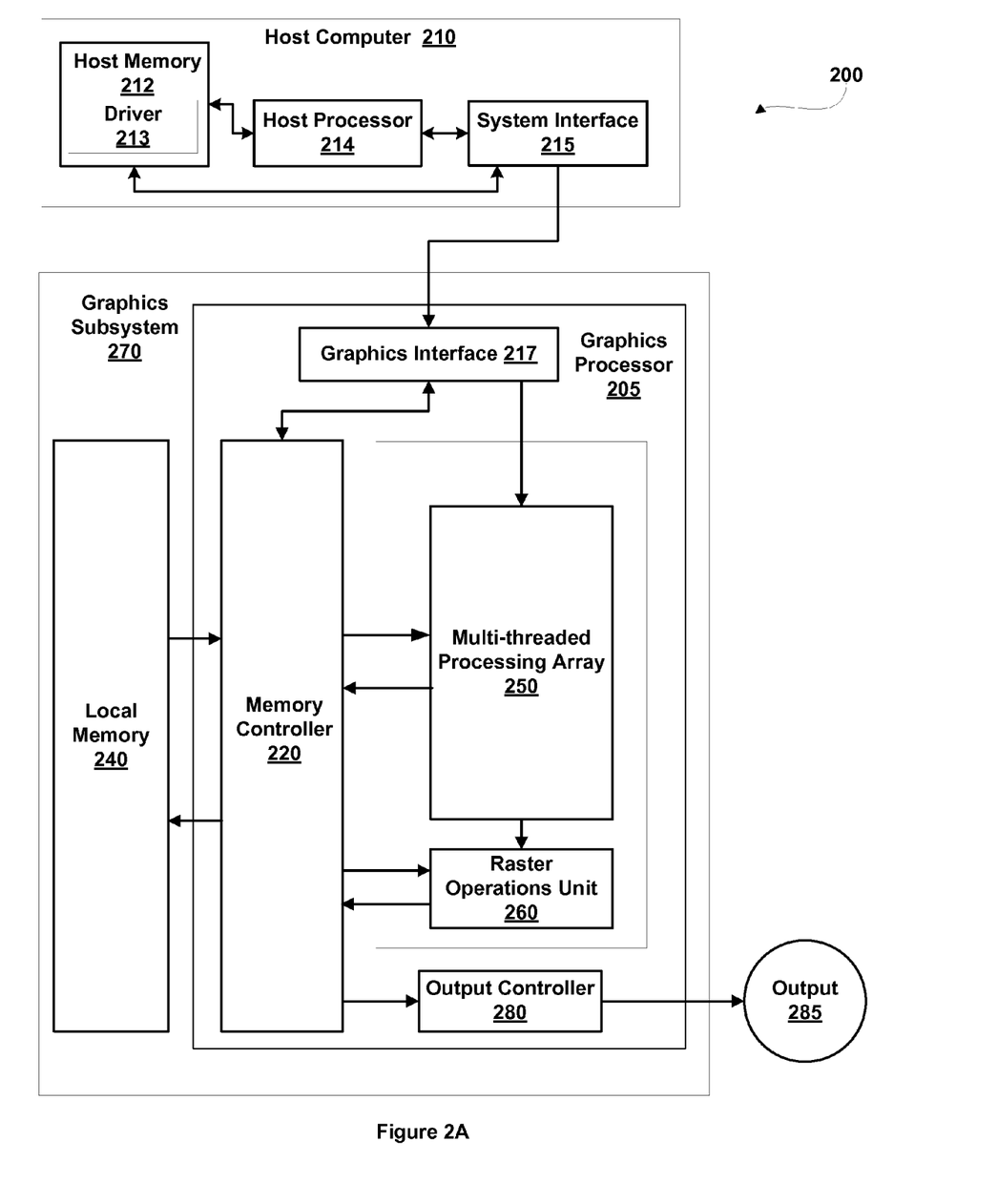
FIG. 2A illustrates a computing system including a host computer and a graphics subsystem in accordance with one or more aspects of the present invention.

FIG. 2A illustrates a computing system generally designated 200 including a host computer 210 and a graphics subsystem 270 in accordance with one or more aspects of the present invention. Computing system 200 may be a desktop computer, server, laptop computer, personal digital assistant (PDA), palm-sized computer, tablet computer, game console, cellular telephone, computer based simulator, or the like. Host computer 210 includes host processor 214 that may include a system memory controller to interface directly to host memory 212 or may communicate with host memory 212 through a system interface 215. System interface 215 may be an I/O (input/output) interface or a bridge device including the system memory controller to interface directly to host memory 212.

A graphics device driver, driver 213, interfaces between processes executed by host processor 214, such as application programs, and a programmable graphics processor 205, translating program instructions as needed for execution by graphics processor 205. Driver 213 also uses commands to configure sub-units within graphics processor 205. Specifically, driver 213 programs page table entries used to translate between virtual memory addresses and physical memory addresses. Contiguous virtual memory pages do not necessarily map to contiguous physical memory pages. Driver 213 may also program page table entries specifying a particular partition stride, bank interleave pattern, and/or partition interleave pattern for each virtual memory page. Driver 213 also allocates virtual memory pages corresponding to portions of local memory 240 that are used to store graphics surfaces including image data and texture maps.

Host computer 210 communicates with graphics subsystem 270 via system interface 215 and a graphics interface 217 within a graphics processor 205. Data received at graphics interface 217 can be passed to a multi-threaded processing array 250 or written to a local memory 240 through memory controller 220. Graphics processor 205 uses graphics memory to store graphics data and program instructions, where graphics data is any data that is input to or output from components within the graphics processor. Graphics memory can include portions of host memory 212, local memory 240, register files coupled to the components within graphics processor 205, and the like.

Graphics processor 205 receives commands from host computer 210 via graphics interface 217. Some of the commands are used by multi-threaded processing array 250 to initiate processing of data by providing the location of program instructions or graphics data stored in memory. Multi-threaded processing array 250 and a raster operations unit 260 each include an interface to memory controller 220 through which program instructions and data can be read from memory, e.g., any combination of local memory 240 and host memory 212.

Multi-threaded processing array 250 optionally reads processed data, e.g., data written by raster operations unit 260, from memory and performs additional operations on the processed data before outputting the further processed data to raster operations unit 260. Multi-threaded processing array 250 and raster operations unit 260 each contain one or more programmable processing units to perform a variety of specialized functions. Some of these functions are table lookup, scalar and vector addition, multiplication, division, coordinate-system mapping, calculation of vector normals, tessellation, calculation of derivatives, interpolation, and the like. Multi-threaded processing array 250 and raster operations unit 260 are each optionally configured such that data processing operations are performed in multiple passes through those units or in multiple passes within Multi-threaded processing array 250. Multi-threaded processing array 250 and raster operations unit 260 each include a read interface to memory controller 220. Raster operations unit 260 also includes a write interface to memory controller 220 through which data can be written to memory.

In a typical implementation, multi-threaded processing array 250 performs geometry computations, rasterization, and pixel computations. Therefore, multi-threaded processing array 250 is programmed to operate on surface, primitive, vertex, fragment, pixel, sample or any other data. For simplicity, the remainder of this description will use the term "samples" to refer to graphics data such as surfaces, primitives, vertices, pixels, fragments, or the like.

Samples output by multi-threaded processing array 250 are passed to raster operations unit 260, which optionally performs near and far plane clipping and raster operations, such as stencil, z test, and the like, and saves the results or the samples output by multi-threaded processing array 250 in local memory 240. When the data received by graphics subsystem 270 has been completely processed by graphics processor 205, an output 285 of graphics subsystem 270 is provided using an output controller 280. Output controller 280 is optionally configured to deliver data to a display device, network, electronic control system, other computing system 200, other graphics subsystem 270, or the like. Alternatively, data is output to a film recording device or written to a peripheral device, e.g., disk drive, tape, compact disk, or the like.

Figure 2B:
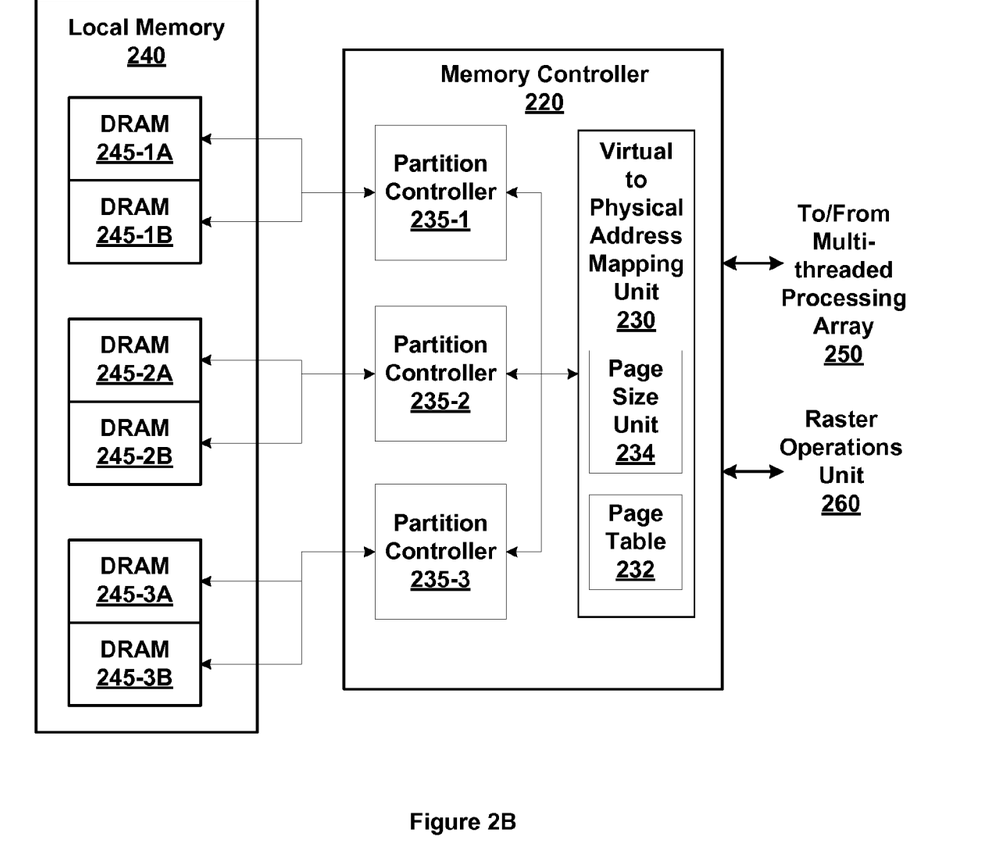
FIG. 2B illustrates memory controller 220 and local memory 240 of FIG. 2A in accordance with one or more aspects of the present invention.

FIG. 2B illustrates memory controller 220 and local memory 240 of FIG. 2A in accordance with one or more aspects of the present invention. Memory controller 220 includes a virtual to physical address mapping unit 230 that translates virtual addresses received from multithreaded processing array 250 and raster operations unit 260 into physical addresses in graphics memory. Virtual to physical address mapping unit 230 includes a page table 232 that stores information used to perform the translation, e.g., partition stride, bank interleave pattern, partition interleave pattern, surface compression format, virtual memory page to physical memory page mapping, DRAM configuration information, and the like. A portion of a virtual address is used to access an entry of page table 232 and obtain an address of a virtual page in physical memory.

Virtual to physical address mapping unit 230 also includes a page size unit 234 that determines a virtual memory page size based on the number of partitions, including non-power-of-two virtual memory pages sizes. In some embodiments of the present invention page size unit 234 is configured to compute a virtual memory page size unit, as described in conjunction with FIG. 3C. In other embodiments of the present invention, page size unit 234 is configured to store virtual memory page unit sizes that each correspond to a number of partitions, i.e., page size unit 234 is a lookup table. The virtual memory page unit sizes are precomputed and page size unit 234 may be a read-only memory (ROM) or a set of registers that is loaded by driver 213.

In some embodiments of the present invention the virtual address space is divided into virtual memory pages which can be either 4 Kbytes or 64 Kbytes. A virtual page describes a region of virtual memory with common properties that maps to a contiguous region of physical memory. Based on the virtual page size, a 40 bit virtual address can be broken into the following fields for 4 Kbyte virtual pages:

Bits [7:0]: Specify the byte within a 256 byte physical region.

Bits [11:8]: Specify the 256 byte physical region within the 4 Kbyte virtual page.

Bits [39:12]: Specify the virtual page address.

The 40 bit virtual address can be broken into the following fields for 64 Kbyte virtual pages:

Bits [7:0]: Specify the byte within a 256 byte physical region.

Bits [15:8]: Specify the 256B physical region within the 64 Kbyte virtual page.

Bits [39:16]: Specify the virtual page address.

When the physical address is in local memory 240, the physical address is converted into a partition number and RBC (row-bank-column) address within a DRAM 245. The DRAMs 245 coupled to a partition controller 235 are also referred to as a partition, e.g., DRAM 245-1A and DRAM 245-1B are a partition. Each partition controller 235 corresponds to a unique partition number. Each partition controller 235 is coupled to a pair of DRAMs 245. For example a first partition controller 235-1 is coupled to DRAM 245-1A and DRAM 245-1B. A second partition controller 235-2 is coupled to DRAM 245-2A and DRAM 245-2B and a third partition controller 235-3 is coupled to DRAM 245-3A and DRAM 245-3B. In some embodiments of the present invention, memory controller 220 may include one or more partitions with each partition controller 235 including a multi-bit, e.g., 32 bit, 64 bit, or the like, interface to local memory 240. When a manufacturing defect prevents a particular partition controller 235 from functioning properly or when a DRAM 245 is not populated, a number of active (functional) partitions may be updated accordingly and stored in virtual to physical address mapping unit 230. When page size unit 234 as a lookup table, the entries storing various virtual memory page sizes are loaded with values that are computed based on the number of active partitions. Therefore, memory controller 220 may be configured to best utilize the portions of local memory 240 that are available.

Portions of a graphics surface are stored in each partition to distribute the data for more efficient access. This distribution results in greater bandwidth utilization and higher performance for memory bandwidth limited functions, such as texture mapping. Each DRAM 245 in local memory 240 is configured to store data in separate banks of memory, as previously described in conjunction with FIG. 1.

Figure 3A:
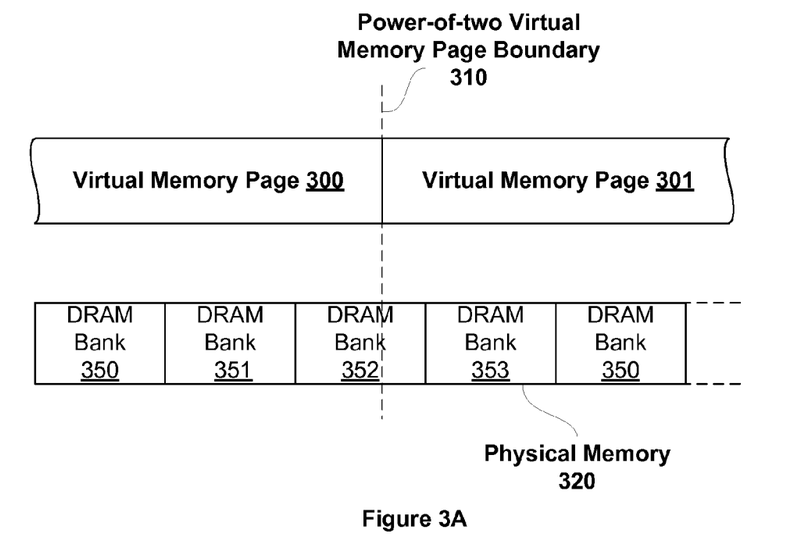
FIG. 3A illustrates the correspondence between virtual memory pages and DRAM banks with power-of-two virtual memory page sizes in accordance with one or more aspects of the present invention.

FIG. 3A illustrates the correspondence between virtual memory pages and DRAM banks with conventional power-of-two virtual memory page sizes, in accordance with one or more aspects of the present invention. Each virtual memory page is mapped to some physical memory page and the mapping information is stored in page table 232. Sequential virtual memory pages are not required to be mapped to sequential physical memory pages. Therefore, the starting partition of a virtual memory page is not known until the physical memory page that it maps to is specified. Furthermore, some possible numbers of partitions, e.g., 3, 5, or 6, do not divide evenly into a power-of-two virtual memory page size, resulting in virtual memory page boundaries that intersect DRAM banks.

A virtual memory page boundary 310 separates virtual memory page 300 and virtual memory page 301 that are mapped to portions of physical memory 320. Physical memory 320 includes four DRAM banks, DRAM bank 350, DRAM bank 351, DRAM bank 352, and DRAM bank 353. Virtual memory page 300 ends and virtual memory page 301 begins within the same DRAM bank 352. If the bank interleave patterns are different for virtual memory page 300 and virtual memory page 301, then memory location aliasing problems can exist since a single physical memory location may be mapped to an entry virtual memory page 300 and to an entry in virtual memory page 301. A partition stride may also be specified for each virtual memory page allocated to the graphics surfaces. Consequently, memory location aliasing may result when the partition stride changes within a DRAM bank, i.e., when virtual memory page boundary 310 intersects DRAM bank 352. Memory locations within a portion of DRAM bank 352 allocated to virtual memory page 300 may also be accessed, via memory location aliasing, through virtual memory page 301 resulting in data corruption.

A solution to avoid memory location aliasing is to only allocate virtual memory pages in groups of N virtual memory pages where N is the number of partitions. However, increasing the minimum virtual memory page allocation size for each graphics surface may decrease the number of graphics surfaces that are stored in local memory 240. In particular, a smaller minimum allocation size is desirable to efficiently store many small texture maps.

Figure 3B:
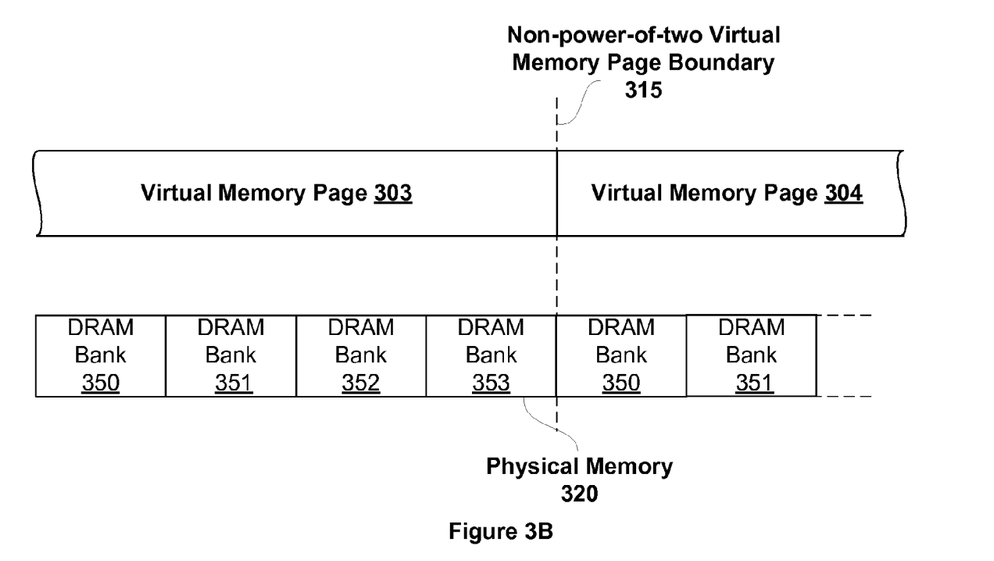
FIG. 3B illustrates the correspondence between virtual memory pages and DRAM banks with non-power-of-two virtual memory page sizes in accordance with one or more aspects of the present invention.

FIG. 3B illustrates the correspondence between virtual memory pages 303 and 304 and DRAM banks with non-power-of-two virtual memory page sizes, in accordance with one or more aspects of the present invention. When the number of partitions is a non-power-of-two value and the virtual memory page size is also a non-power-of-two size this results in a non-power-of-two virtual memory page boundary 315 that is aligned with a boundary between two DRAM banks, e.g., bank 353 and 350. Using the non-power-of-two virtual page size allows for addressing schemes with varying bank interleave patterns and partition interleave patterns. Each virtual memory page includes an integer number of DRAM bank sets, where each DRAM bank set is the number of banks in the DRAMs. For example, when the DRAMs have 4 banks, a DRAM bank set is 4. A partition stride for each DRAM in a DRAM bank set includes equal portions of a single bank from each and every partition. The partition stride is the minimum equal portion and the minimum virtual memory page size, i.e., virtual memory page unit size, is equal to the three-way product of the partition stride, the DRAM bank set, and the number of partitions.

The bank interleave pattern within a virtual memory page may be changed by reorganizing bits of the physical address to swizzle the partitions within a DRAM bank, using techniques known to those skilled in the art. Similarly, the partition interleave pattern may also be changed using the same techniques known to those skilled in the art. Changing the bank interleave pattern and partition interleave pattern may be necessary to reduce bank conflicts and hot spots, respectively.

Figure 3C:
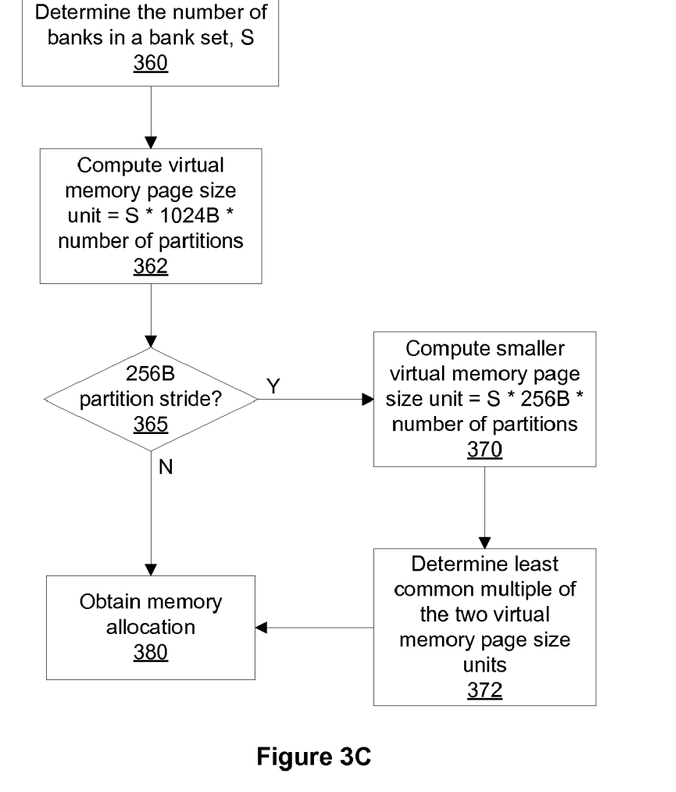
FIGS. 3C and 3D illustrate flow diagrams of exemplary methods of determining the non-power-of-two virtual memory page size in accordance with one or more aspects of the present invention.

FIG. 3C illustrates a flow diagram of an exemplary method of determining the non-power-of-two virtual memory page size, in accordance with one or more aspects of the present invention. In step 360 the number of banks in a bank set, S is determined by the driver 213. Conventional DRAMs have 4 or 8 banks. In step 375 driver 213 computes the virtual memory page unit size as S*1024 bytes*the number of partitions to accommodate the largest partition stride, e.g., 1024 bytes. In step 365 driver 213 determines if the partition stride is 256 bytes, and, if so, in step 370 driver 213 computes the smaller virtual memory page unit size as S*256 bytes*the number of partitions. In step 372 driver 213 determines the least common multiple of the two virtual memory page unit sizes computed in steps 362 and 370 as the virtual memory page unit size. The virtual page size allocated by driver 213 can be any multiple of the least common multiple. If, in step 365 driver 213 determines that the partition stride is not 256 bytes, then driver 213 proceeds directly to step 380.

In other embodiments of the present invention, different partition strides may be used to interleave the memory partitions and compute the virtual memory page unit size. In step 380 driver 213 allocates the number of virtual memory page units needed for a graphics surface. The size of a virtual memory page is an integer number of virtual memory page units, and, therefore the virtual memory page size is not necessarily a power-of-two value. Each virtual memory page is mapped to a physical memory page and the mapping information is stored in page table 232 along with the partition stride that is specified for each virtual memory page. The virtual memory page size is consistent even when the partition stride varies, allowing for the partition stride to be specified based on the type of data that is stored in each virtual memory page.

In other embodiments of the present invention, page size unit 234 performs steps 360, 362, 365, 370, 372, and 380 to compute the virtual memory page size. In some embodiments of the present invention both page size unit 234 and driver 213 perform the steps, with either page size unit 234 or driver 213 generating the memory allocation request for the graphics surface.

Figure 3D:
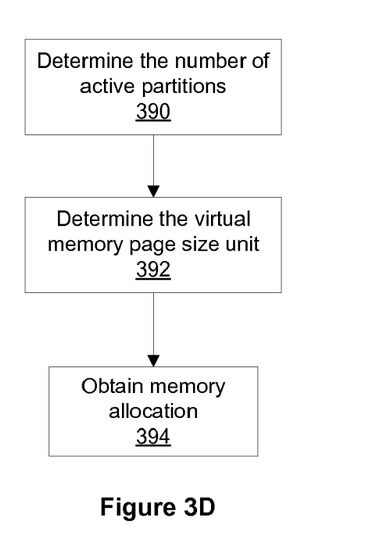

FIG. 3D illustrates a flow diagram of another exemplary method of determining the non-power-of-two virtual memory page size, in accordance with one or more aspects of the present invention. In this embodiment of the present invention, page size unit 234 is a lookup table the stores the virtual memory page unit sizes that were computed for various numbers of partitions, The partition stride and number of banks in a bank set may be fixed when the various virtual memory page unit sizes are computed based on a particular configuration for computing system 200.

In step 390 the number of active partitions is determined and provided to page size unit 234. In step 392 the number of active partitions is used to read an entry of page size unit 234 to produce a virtual memory page size unit corresponding to the number of active partitions. In step 394 requests the number of virtual memory page units needed for the graphics surface. In other embodiments of the present invention, steps 390, 392, and 394 may also be performed by driver 213 to determine the virtual memory page size.

Figure 4A:
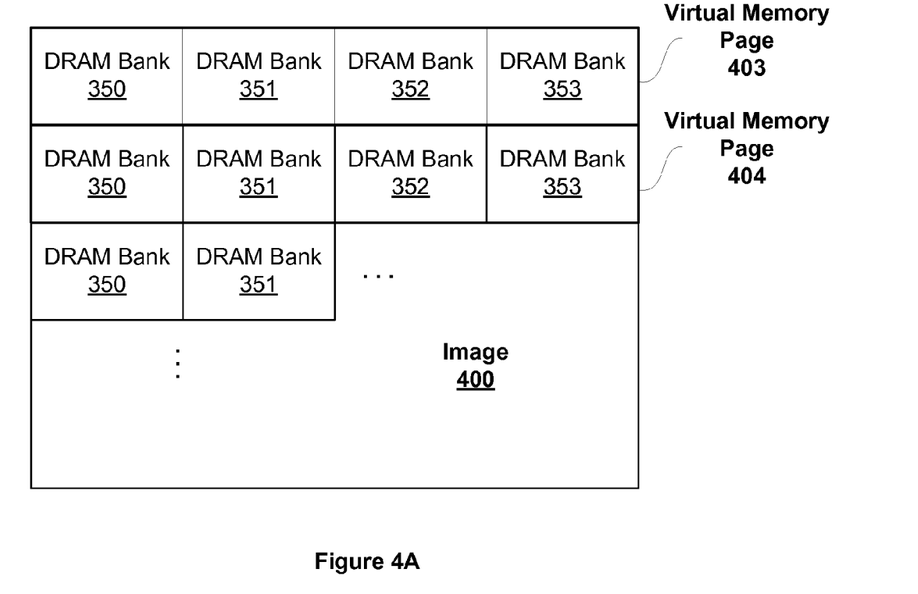
FIG. 4A illustrates a conceptual diagram of a mapping of DRAM banks to a two-dimensional image in accordance with one or more aspects of the present invention.

FIG. 4A illustrates a conceptual diagram of a mapping of DRAM banks 350, 351, 352, and 353, to a two-dimensional image 400, in accordance with one or more aspects of the present invention. Each DRAM 245 may include 2, 4, and 8 or more memory banks that each contain pages. The effective size of one page in a bank, i.e., bank page size, is $2^{(w+colBits)}$, where w is the log base 2 of the data bus width of a DRAM 245 in bytes and colBits is the number of column bits in a DRAM 245. The interleave pattern resulting when a single partition stride is applied across partitions is much smaller than the bank page size. Therefore, the same bank in all partitions can be considered to be a superpage distributed over the partitions.

In FIG. 4A DRAM bank 350 is a first bank of DRAMs 245 of FIG. 2B, DRAM bank 351 is a second bank, DRAM bank 352 is a third bank, and DRAM bank 353 is a fourth bank. Portions of each DRAM bank 350, 351, 352, and 353 are interleaved within image 400 and the memory entries of each bank page are mapped onto a two-dimensional portion of image 400. A superpage is distributed across image 300 as several DRAM banks 350, 351, 352, and 353. The distribution of data over interleaved DRAM banks allows the precharge and activate delays to be hidden as an image is accessed in a horizontal, vertical, or other linear pattern, e.g., diagonal.

In FIG. 4A each virtual memory page 403 and 404 includes one set of DRAM banks where the set includes DRAM bank 350, 351, 352, and 353. The same interleave pattern is used for virtual memory page 403 and 404, therefore, DRAM bank 350 is vertically aligned within image 400. Likewise, DRAM banks 351, 352, and 353 are also vertically aligned within image 400. Therefore, bank collisions may exist and the bank precharge and activate delays may not be hidden, resulting in reduced memory bandwidth utilization when rendering proceeds in the vertical direction.

Figure 4B:
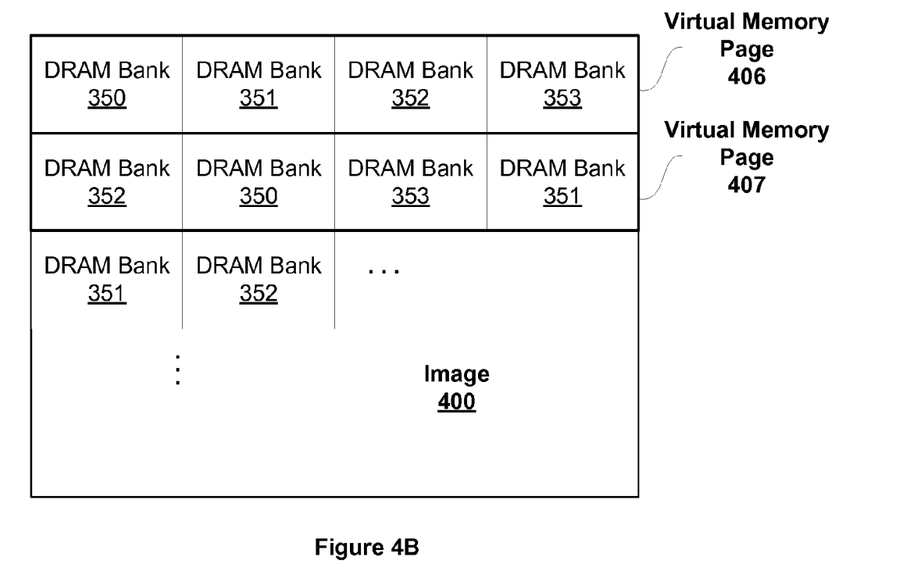
FIG. 4B illustrates a conceptual diagram of a modified mapping of DRAM banks to a two-dimensional image in accordance with one or more aspects of the present invention.

FIG. 4B illustrates a conceptual diagram of a modified mapping of DRAM banks 350, 351, 352, and 353, to two-dimensional image 400, in accordance with one or more aspects of the present invention. The bank interleave pattern specified for virtual memory page 406 is different from the bank interleave pattern specified for virtual memory page 407. Therefore, DRAM bank 350 is not vertically aligned within image 400 and the bank precharge and activate delays may be hidden as rendering proceeds in the vertical direction, resulting in increased memory bandwidth utilization. Virtual memory pages 403, 404, 406, and 407 may each include a non-power-of-two number of entries and address bit swizzling may be used to map DRAM banks 350, 351, 352, and 353 according to the different interleave patterns. Note that different vertical alignments will results as the width of image 400 varies. When determining a bank interleave pattern the image width that the DRAM bank sets within the virtual memory pages should be accounted for.

Figure 4C:
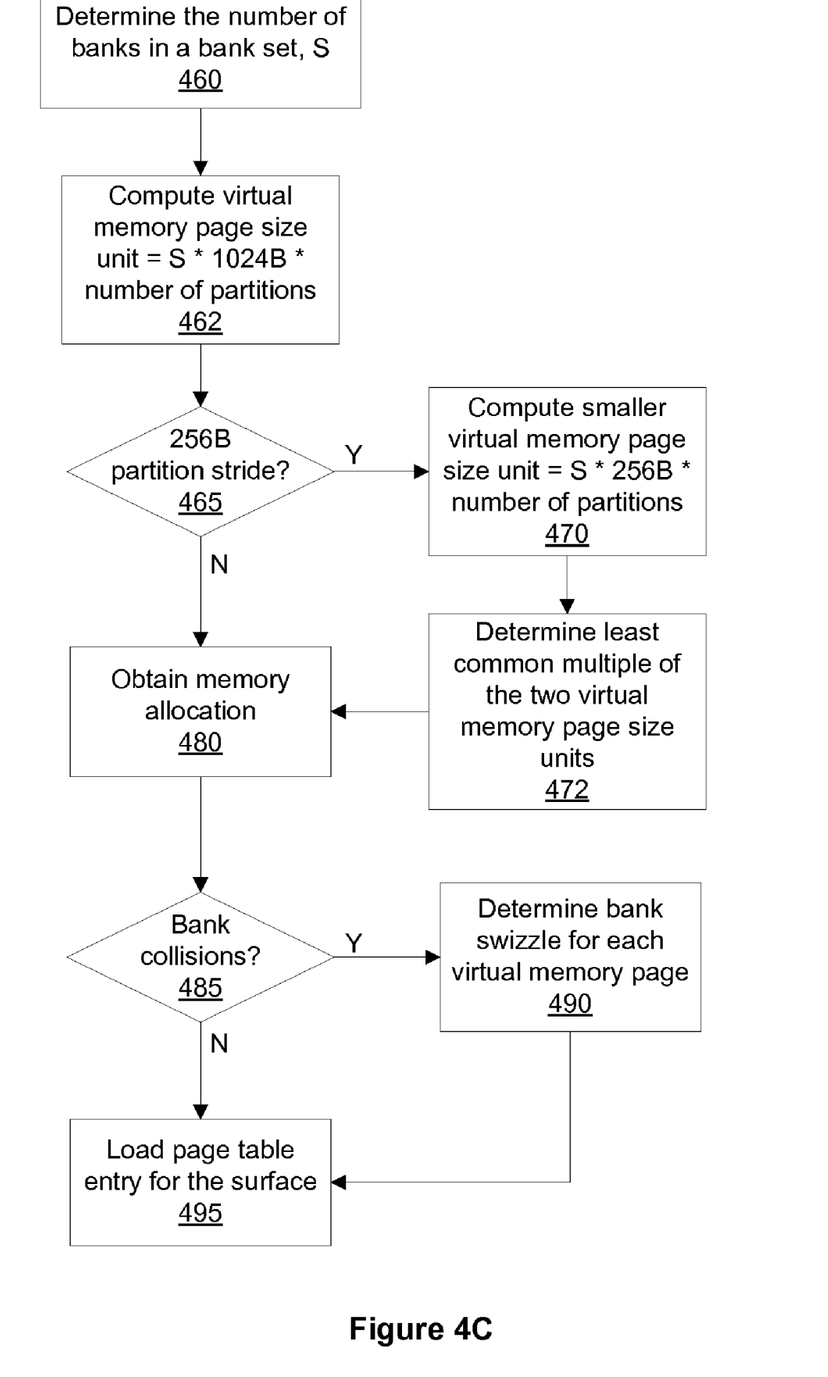
FIG. 4C illustrates a flow diagram of an exemplary method of determining the non-power-of-two virtual memory page size and modifying the bank interleave pattern in accordance with one or more aspects of the present invention.

FIG. 4C illustrates a flow diagram of an exemplary method of determining the non-power-of-two virtual memory page size and modifying the bank interleave pattern, in accordance with one or more aspects of the present invention. Steps 460, 462, 465, 470, 472, and 480 correspond to steps 360, 362, 365, 370, 372, and 380 of FIG. 3C, respectively, and are performed as previously described. In step 485 driver 213 determines if bank collisions may exist between DRAM banks within different virtual memory pages mapped to an image. This determination is based on the width of the image and the number of banks in a set. If, in step 485 driver 213 determines that a bank interleave pattern may be used to avoid bank collisions, then in step 490 driver 213 determines a bank interleave, i.e., swizzle, pattern for each virtual memory page allocated for the image and proceeds to step 495. If, in step 485 driver 213 determines that a bank interleave pattern is not needed to avoid bank collisions, then in driver 213 proceeds directly to step 495. In step 495 driver 213 loads one or more entries in page table 232 to specify bank interleave patterns for each virtual memory page allocated to the surface.

The bank interleave pattern specified for a virtual memory page is used to determine a physical address to access data in the surface. Address bits may be swapped, using techniques known to those skilled in the art to implement specific bank interleave patterns.

Figure 5A:
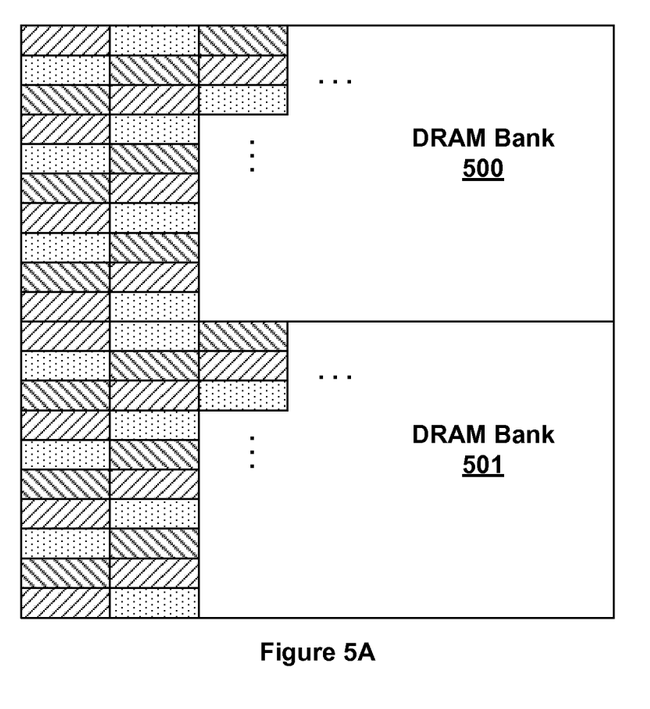
FIG. 5A illustrates a conceptual diagram of partition interleaving for DRAM banks in accordance with one or more aspects of the present invention.

Each DRAM bank 350, 351, 352, or 353 includes rows in each of the partitions. FIG. 5A illustrates a conceptual diagram of partition interleaving for vertically aligned DRAM banks 500 and 501, in accordance with one or more aspects of the present invention. Each of the three patterns shown in DRAM banks 500 and 501 represents a different partition. Each patterned box includes several DRAM entries storing a number of bytes that is the partition stride. For example, when the partition stride is 256 bytes, the partition number changes for each 256 bytes of data stored sequential physical addresses in local memory 240. In some embodiments of the present invention, a partition stride of 256 bytes or 1024 bytes may be specified for each virtual memory page.

Increasing the partition decreases the frequency (in terms of bytes) at which the partition pattern is repeated to fill a physical memory page. For example, the pattern for 2 partitions is partition 0, partition 1, and the pattern for 4 partitions is partition 0, partition 1, partition 2, partition 3. As the pattern is repeated the partitions are interleaved to fill the physical memory page, spreading memory accesses across all of the partitions.

When the same partition is on either side of a boundary between banks, as is the case for the boundary between DRAM bank 500 and DRAM bank 501, a hot spot may exist, and the mapping is not optimal. A hot spot is caused when a single partition is accessed instead of spreading the accesses across all of the partitions to efficiently utilize the memory bandwidth. As rendering proceeds in the vertical direction, it is desirable to access all partitions in parallel. Therefore, the boundary between DRAM banks 500 and 501 should not access the same partition.

Figure 5B:
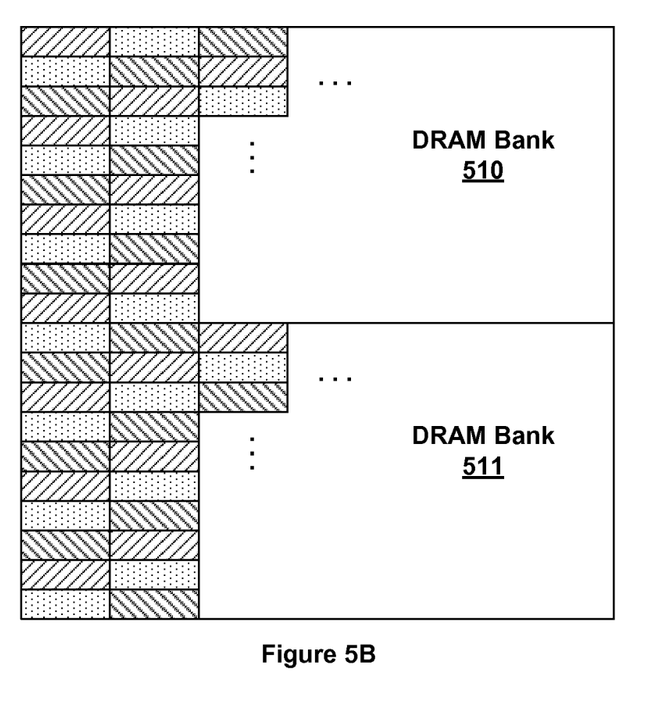
FIG. 5B illustrates a conceptual diagram of a modified partition interleaving for DRAM banks in accordance with one or more aspects of the present invention.

FIG. 5B illustrates a conceptual diagram of a modified partition interleaving for DRAM banks 510 and 511, in accordance with one or more aspects of the present invention. In order to modify the partition mapping to prevent aligned partition mappings such as the one shown in FIG. 5A, a specific partition interleave pattern may be specified for each virtual memory page. DRAM bank 510 is mapped to a first virtual memory page and DRAM bank 511 is mapped to a second virtual memory page. In order to implement the partition interleave pattern for each virtual memory page, the partition mapping equation may include a hash function. The partition mapping patterns may be specified for the first virtual memory page and the second virtual memory page to produce the partition interleave patterns shown in FIG. 5B, where the same partition is not mapped on either side of the boundary between DRAM bank 510 and DRAM bank 511.

When the 256 byte partition stride is used the interleaving may be specified by the code shown in TABLE 1, where PA is the physical address and swz[4:0]=int(PA[n−1:8]/6)%32. Partition [2:0] is the starting partition number for the virtual memory page.

TABLE 1

Partition Stride Interleaving for 256 bytes

1 Partition:
    Partition[2:0] = 0
2 Partitions:
    Partition[2:0] = {0, 0, PA[8] ^ PA[9] ^ PA[10] ^ PA[11] ^ PA[12] ^ PA[13]}
3 Partitions:
    Partition[2:0] = (PA[15:8] + (Partition Offset)) % 3
4 Partitions:
    Partition[2:0] = (PA[14] + PA[13:12] + PA[11:10] + PA[9:8]) % 4
5 Partitions:
    Partition[2:0] = (PA[15:8] + (Partition Offset)) % 5
6 Partitions:
    Partition[2:0] = ((PA[15:8] + (Partition Offset)) % 6) ^ {0, 0, swz[4] swz[3] swz[2] swz[1] swz[0]}

When the 1024 byte partition stride is used the interleaving may be specified as shown by the code in TABLE 2, where $swz8[4:0]=int(PA[n-1:8]/6)\%32$ and $swz10[4:0]=int(PA[n-1:10]/6)\%32$. Those skilled in the art will appreciate that the partition mapping can also be perturbed using similar equations to interleave other partition stride sizes and for other embodiments of the present invention, including embodiments that may use a different number of partitions.

TABLE 2

Partition Stride Interleaving for 1024 bytes

1 Partition:
    Partition[2:0] = 0
2 Partitions:
    Partition[2:0] = {0, 0, PA[10] ^ PA[11] ^ PA[12] ^ PA[13]}
3 Partitions:
    Partition[2:0] = (PA[15:10] + (Partition Offset)) % 3
4 Partitions:
    Partition[2:0] = (PA[14] + PA[13:12] + PA[11:10]) % 4
5 Partitions:
    Partition[2:0] = (PA[15:10] + (Partition Offset)) % 5
6 Partitions:
    Partition[2:0] = ((PA[15:10] + (Partition Offset)) % 6) ^ {0, 0, swz10[4] swz10[3] swz10[2] swz10[1] swz10[0]}

Figure 5C:
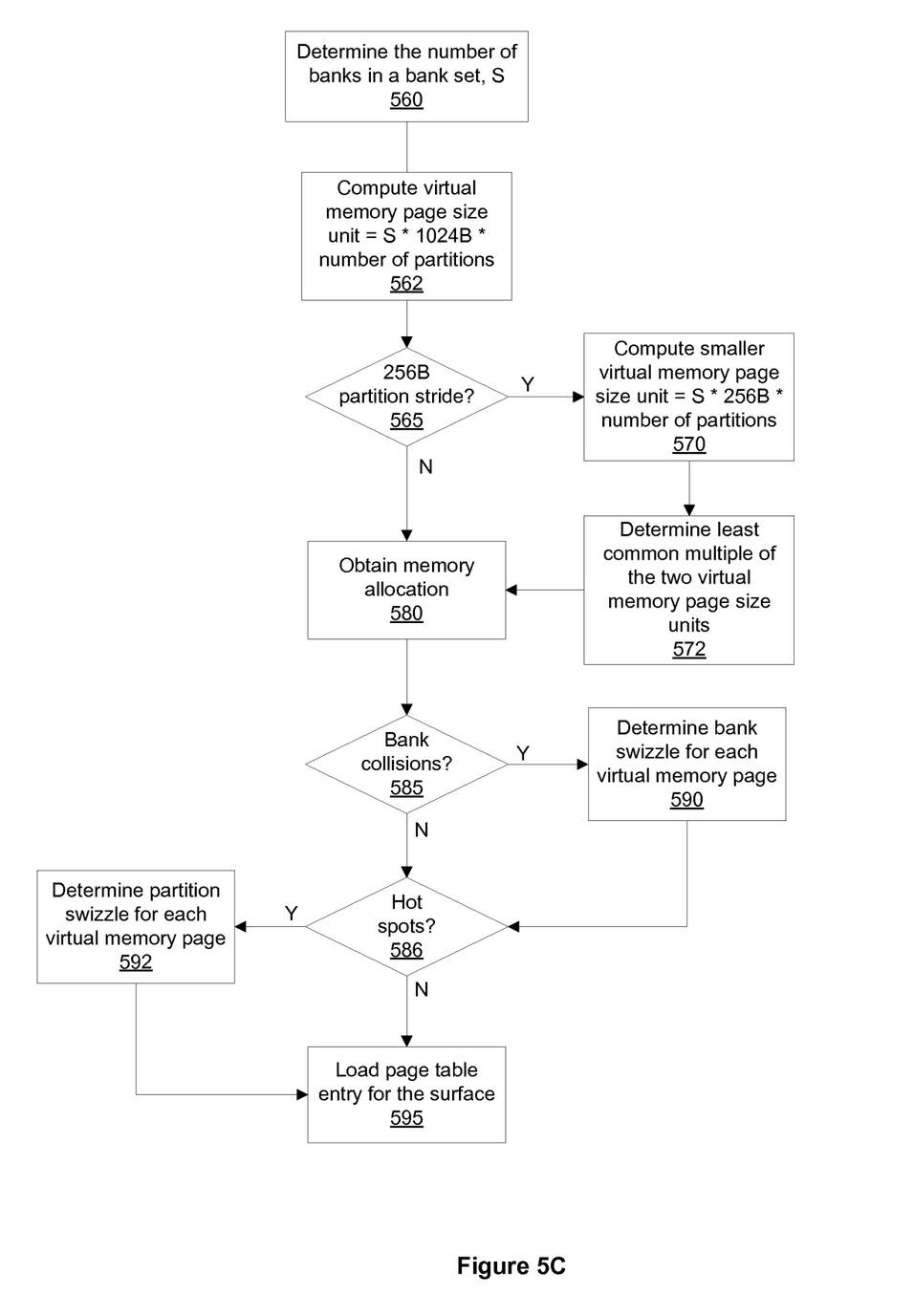
FIGS. 5C and 5D illustrate flow diagrams of exemplary methods of determining the non-power-of-two virtual memory page size and modifying the bank interleave pattern and partition interleave pattern in accordance with one or more aspects of the present invention.

FIG. 5C illustrates a flow diagram of an exemplary method of determining the non-power-of-two virtual memory page size and modifying the bank interleave pattern and the partition interleave pattern, in accordance with one or more aspects of the present invention. Steps 560, 562, 565, 570, 572, 580, 585, and 590 correspond to steps 460, 462, 465, 470, 472, 480, 485, and 490 of FIG. 4C, respectively, and are performed as previously described. In step 586 driver 213 determines if the partition interleave pattern should be changed for a virtual memory pages to avoid hot spots, and, if so, then in step 592 driver 213 determines a partition interleave, i.e., swizzle, pattern for each virtual memory page allocated for the image and proceeds to step 595.

When accessing local memory 240 virtual to physical address mapping unit 230 may use a hash function to modify the partition mapping within each DRAM bank for improved memory access bandwidth. Specifically, one of the computations listed in TABLE 1 or TABLE 2 may be used to compute the partition number based on the physical address, number of partitions, and partition offset.

If, in step 586 driver 213 determines that a partition interleave pattern is not needed to avoid hot spots, then in driver 213 proceeds directly to step 595. In step 595 driver 213 loads one or more entries in page table 232 to specify partition interleave patterns for each virtual memory page allocated to the surface.

Figure 5D:
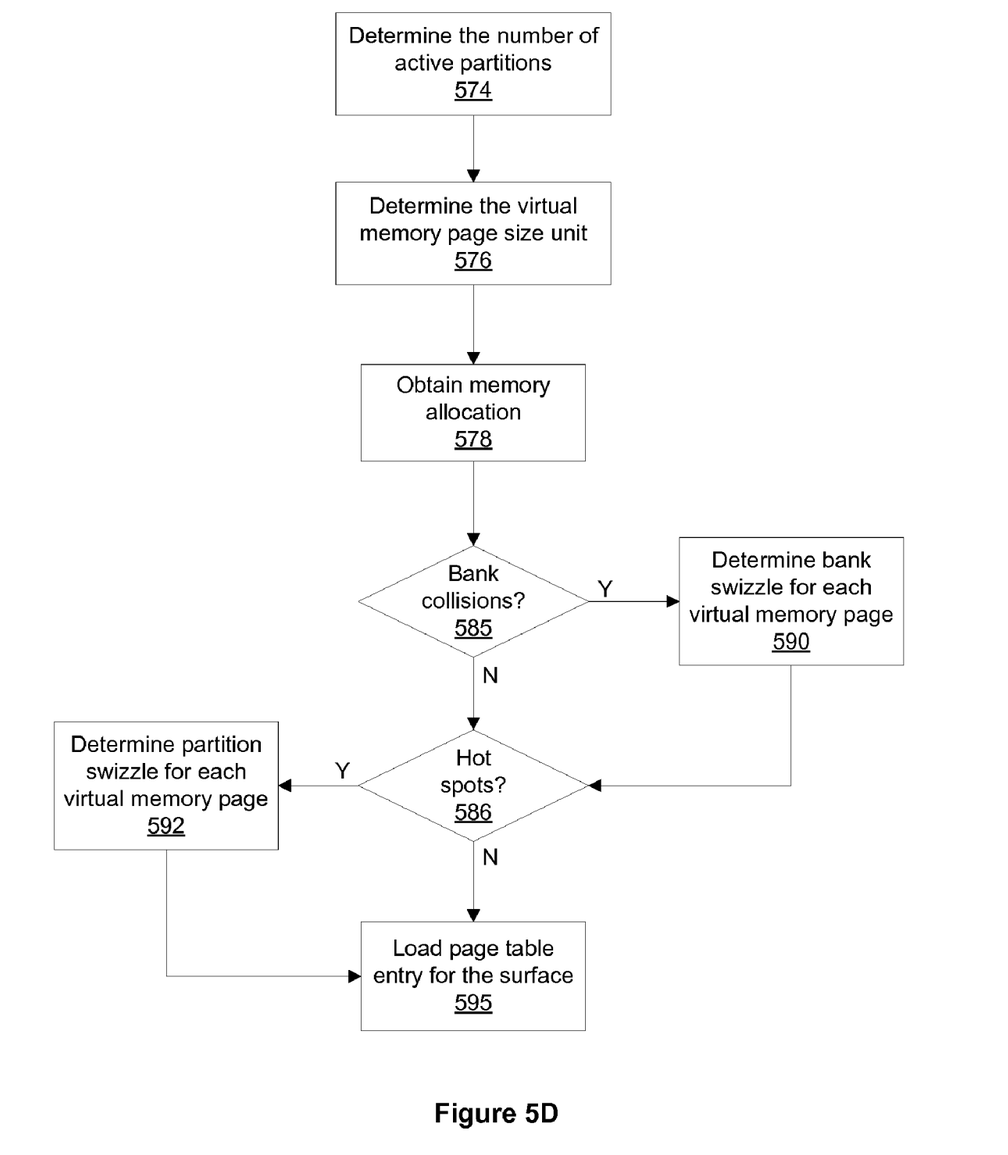

FIG. 5D illustrates a flow diagram of another exemplary method of determining the non-power-of-two virtual memory page size and modifying the bank interleave pattern and the partition interleave pattern, in accordance with one or more aspects of the present invention. In this embodiment of the present invention, page size unit 234 is a lookup table that stores virtual memory page unit sizes for various numbers of partitions. Steps 574, 576, and 578 correspond to steps 390, 392, and 394 of FIG. 3D, respectively, and are performed as previously described. Steps 585 590, 586, 592, and 595 are completed as previously described in conjunction with FIG. 5C.

Persons skilled in the art will appreciate that any system configured to perform the method steps of FIG. 3C, 4C, or 5C, or their equivalents, is within the scope of the present invention. Non-power-of-two virtual page sizes are used when the number of partitions is not a power of two to allow each virtual page to use a specific bank interleave pattern, partition stride, and partition interleave pattern to improve bandwidth utilization. Systems and methods for addressing memory where data is interleaved across different banks using different interleaving granularities improve graphics memory bandwidth by distributing graphics data for efficient access during rendering. Using the non-power-of-two virtual page size allows for addressing schemes with varying bank interleave patterns and partition interleave patterns. Conventional systems do not use non-power-of-two virtual page sizes and are not able to use efficient addressing schemes to modify bank interleave patterns and partition interleave patterns.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of mapping physical memory constructed of multiple partitions to a virtual memory space, comprising:

determining a bank set as a number of banks in a dynamic random access memory (DRAM) device included in each one of the multiple partitions;

determining a number of partitions in the multiple partitions that are available in the physical memory;

computing a virtual memory page unit size for the virtual memory space as a product of the number of partitions, a partition stride, and the number of banks in the bank set, wherein the partition stride specifies a span in an address space of the physical memory between adjacent partitions of the multiple partitions and a virtual memory page boundary between two virtual memory page unit size virtual memory pages is aligned with a boundary between two of the multiple partitions in the physical memory;

allocating virtual memory pages to a graphics surface for storing data in the memory constructed of the multiple partitions, wherein a size of the virtual memory pages is a product of an integer and the virtual memory page unit size; and     mapping the number of the banks within each DRAM device to a two-dimensional image stored in the physical memory as the graphics surface, wherein equal sized portions of the banks are interleaved in image space according to a bank interleave pattern that is stored in a page table entry for the virtual memory pages.

2. The method of claim 1, further comprising specifying the bank interleave pattern for each one of the virtual memory pages allocated to the graphics surface so that vertical, horizontal, or other linear accesses in image space access data stored in different banks to avoid DRAM bank conflicts.

3. The method of claim 1, further comprising specifying a partition interleave pattern for each one of the virtual memory pages allocated to the graphics surface, wherein partition strides within the equal sized portions of the banks are interleaved in image space according to the partition interleave pattern.

4. The method of claim 1, wherein the computing of the virtual memory page unit size is performed by reading the virtual memory page unit size from a lookup table using the number of partitions.

5. The method of claim 1, wherein the number of partitions in the multiple partitions that are available in the physical memory is a first non-power-of-two value and the size of the virtual memory pages is a second non-power-of-two value, wherein a log base 2 of the first non-power-of-two value is not an integer and a log base 2 of the second non-power-of-two value is not an integer.

6. The method of claim 1, further comprising the steps of:
determining a least common multiple of the virtual memory page unit size and a smaller virtual memory page unit size, when the partition stride equals a minimum partition stride, wherein the smaller virtual memory page unit size is a product of the number of partitions, the minimum partition stride, and the number of banks; and
setting the virtual memory page unit size to the least common multiple of the virtual memory page unit size and the smaller virtual memory page unit size.

7. A method of mapping multiple physical memory partitions to non-power-of-two size virtual memory pages of a virtual memory space, comprising:
determining a number of partitions in the multiple physical memory partitions;
obtaining a partition stride that specifies a portion of each one of the multiple physical memory partitions to produce a combined portion including one portion from each one of the multiple physical memory partitions, wherein the combined portion creates a contiguous physical memory space equal to the partition stride scaled by the number of partitions;
computing a non-power-of-two virtual memory page size for the virtual memory space that permits a variety of partition interleave patterns to reorganize the mapping of portions of the multiple physical memory partitions to a set of non-power-of-two size virtual memory pages that are allocated to a graphics surface, wherein a log base 2 of the non-power-of-two size is not an integer and each boundary between two of the non-power-of-two size virtual memory pages is aligned to a boundary between two of the multiple physical memory partitions;
determining a bank set as a number of banks in a dynamic random access memory (DRAM) device included in each one of the multiple physical memory partitions; and
specifying a bank interleave pattern for each one of the virtual memory pages allocated to the graphics surface, wherein the non-power-of-two virtual memory page size permits a variety of bank interleave patterns to reorganize a mapping of the banks to the set of non-power-of-two size virtual memory pages that are allocated to the graphics surface.

8. The method of claim 7, further comprising:
specifying a partition interleave pattern for each one of the virtual memory pages allocated to the graphics surface, wherein partition strides within each one of the banks within each DRAM device are interleaved in image space according to the partition interleave pattern.

9. The method of claim 7, further comprising:
reading a virtual memory page unit size for the virtual memory space stored in a lookup table using the number of partitions; and
allocating a portion of the non-power-of-two size virtual memory pages of the virtual memory space to the graphics surface for storing data in a memory constructed of the multiple physical memory partitions, wherein a size of the non-power-of-two size virtual memory pages is a product of an integer and the virtual memory page unit size.

10. A system for mapping memory constructed of multiple physical memory partitions to a virtual address space, comprising:
a virtual to physical address mapping unit configured to store mapping information for non-power-of-two size virtual memory pages allocated to a graphics surface, wherein the mapping information includes a physical memory page address and a partition stride that specifies a span in address space between adjacent physical memory partitions of the multiple physical memory partitions and each boundary between two of the non-power-of-two size virtual memory pages is aligned to a boundary between two of the multiple physical memory partitions;
a first partition controller corresponding to a first partition number and configured to receive physical addresses from the virtual to physical address mapping unit to read data from the memory or write data to the memory; and
a second partition controller corresponding to a second partition number and configured to receive physical addresses from the virtual to physical address mapping unit to read data from the memory or write data to the memory; and
a first pair of dynamic random access memories (DRAMs) coupled to the first partition controller and configured to appear as a first single memory device that stores data corresponding to the first partition number; and
a second pair of DRAMs coupled to the second partition controller and configured to appear as a second single memory device that stores data corresponding to the second partition number, wherein banks within the DRAMs are mapped to a two-dimensional image stored in the memory as a graphics surface and equal sized portions of the banks are interleaved in image space according to a interleave pattern included in the mapping information for each one of the non-power-of-two size virtual memory pages allocated to the graphics surface.

11. The system of claim 10, wherein partition stride sized portions of each one of the multiple partitions are mapped to the equal sized portions of the banks and the partition stride sized portions are interleaved in image space according to a partition interleave pattern included in the mapping information for each one of the non-power-of-two size virtual memory pages allocated to the graphics surface.

12. The system of claim 10, wherein the virtual to physical address mapping unit includes a lookup table configured to store sizes of the virtual memory pages for various numbers of partitions in the multiple physical memory partitions.

13. The system of claim 10, wherein the virtual to physical address mapping unit is further configured to compute a virtual memory page unit size for the virtual memory space as a product of a number of partitions in the multiple physical memory partitions, the partition stride, and a number of banks in a dynamic random access memory (DRAM) device included in each one of the multiple physical memory partitions, when the partition stride is a maximum partition stride, and device driver is configured to compute the virtual memory page unit size as a least common multiple of a smaller virtual memory page unit size and the product of the number of partitions, the maximum partition stride, and the number of banks, when the partition stride is not a maximum partition stride, wherein the smaller virtual memory page unit size is a product of the number of partitions, the partition stride, and the number of banks.

14. The system of claim 10, further comprising a device driver configured to determine the non-power-of-two size of the virtual memory pages by reading a lookup table using a number of partitions in the multiple physical memory partitions.

15. The system of claim 10, further comprising a device driver configured to compute a virtual memory page unit size for the virtual memory space as a product of a number of partitions in the multiple physical memory partitions, the partition stride, and a number of banks in a dynamic random access memory (DRAM) device included in each one of the multiple physical memory partitions, when the partition stride is a maximum partition stride, and device driver is configured to compute the virtual memory page unit size as a least common multiple of a smaller virtual memory page unit size and the product of the number of partitions, the maximum partition stride, and the number of banks, when the partition stride is not a maximum partition stride, wherein the smaller virtual memory page unit size is a product of the number of partitions, the partition stride, and the number of banks.

16. A system for mapping memory constructed of multiple physical memory partitions to a virtual address space, comprising:
a virtual to physical address mapping unit configured to store mapping information for non-power-of-two size virtual memory pages allocated to a graphics surface, wherein the mapping information includes a physical memory page address and a partition stride that specifies a span in address space between adjacent physical memory partitions of the multiple physical memory partitions and each boundary between two of the non-power-of-two size virtual memory pages is aligned to a boundary between two of the multiple physical memory partitions, wherein the virtual to physical address mapping unit is further configured to compute a virtual memory page unit size for the virtual memory space as a product of a number of partitions in the multiple physical memory partitions, the partition stride, and a number of banks in a dynamic random access memory (DRAM) device included in each one of the multiple physical memory partitions, when the partition stride is a maximum partition stride, and device driver is configured to compute the virtual memory page unit size as a least common multiple of a smaller virtual memory page unit size and the product of the number of partitions, the maximum partition stride, and the number of banks, when the partition stride is not a maximum partition stride, wherein the smaller virtual memory page unit size is a product of the number of partitions, the partition stride, and the number of banks;
a first partition controller corresponding to a first partition number and configured to receive physical addresses from the virtual to physical address mapping unit to read data from the memory or write data to the memory; and
a second partition controller corresponding to a second partition number and configured to receive physical addresses from the virtual to physical address mapping unit to read data from the memory or write data to the memory.

17. A system for mapping memory constructed of multiple physical memory partitions to a virtual address space, comprising:
a virtual to physical address mapping unit configured to store mapping information for non-power-of-two size virtual memory pages allocated to a graphics surface, wherein the mapping information includes a physical memory page address and a partition stride that specifies a span in address space between adjacent physical memory partitions of the multiple physical memory partitions and each boundary between two of the non-power-of-two size virtual memory pages is aligned to a boundary between two of the multiple physical memory partitions;
a first partition controller corresponding to a first partition number and configured to receive physical addresses from the virtual to physical address mapping unit to read data from the memory or write data to the memory;
a second partition controller corresponding to a second partition number and configured to receive physical addresses from the virtual to physical address mapping unit to read data from the memory or write data to the memory; and
a device driver configured to compute a virtual memory page unit size for the virtual memory space as a product of a number of partitions in the multiple physical memory partitions, the partition stride, and a number of banks in a dynamic random access memory (DRAM) device included in each one of the multiple physical memory partitions, when the partition stride is a maximum partition stride, and device driver is configured to compute the virtual memory page unit size as a least common multiple of a smaller virtual memory page unit size and the product of the number of partitions, the maximum partition stride, and the number of banks, when the partition stride is not a maximum partition stride, wherein the smaller virtual memory page unit size is a product of the number of partitions, the partition stride, and the number of banks.

18. A method of mapping physical memory constructed of multiple partitions to a virtual memory space, comprising:
determining a bank set as a number of banks in a dynamic random access memory (DRAM) device included in each one of the multiple partitions;
determining a number of partitions in the multiple partitions that are available in the physical memory;
computing a virtual memory page unit size for the virtual memory space as a product of the number of partitions, a partition stride, and the number of banks in the bank set, wherein the partition stride specifies a span in an address space of the physical memory between adjacent partitions of the multiple partitions and a virtual memory page boundary between two virtual memory page unit size virtual memory pages is aligned with a boundary between two of the multiple partitions in the physical memory; and determining a least common multiple of the virtual memory page unit size and a smaller virtual memory page unit size, when the partition stride equals a minimum partition stride, wherein the smaller virtual memory page unit size is a product of the number of partitions, the minimum partition stride, and the number of banks; and setting the virtual memory page unit size to the least common multiple of the virtual memory page unit size and the smaller virtual memory page unit size.

* * * * *